(12) United States Patent
Fu et al.

(10) Patent No.: US 9,197,441 B2
(45) Date of Patent: Nov. 24, 2015

(54) METHOD AND SYSTEM FOR SERVICE PROTECTION

(75) Inventors: Zhanliang Fu, Shenzhen (CN); Sen Fu, Shenzhen (CN); Yuanyuan Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 713 days.

(21) Appl. No.: 13/574,908

(22) PCT Filed: Apr. 9, 2010

(86) PCT No.: PCT/CN2010/071669
§ 371 (c)(1),
(2), (4) Date: Jul. 24, 2012

(87) PCT Pub. No.: WO2011/091625
PCT Pub. Date: Aug. 4, 2011

(65) Prior Publication Data
US 2012/0294603 A1     Nov. 22, 2012

(30) Foreign Application Priority Data

Feb. 1, 2010  (CN) .......................... 2010 1 0112440

(51) Int. Cl.
*H04L 12/26*       (2006.01)
*H04L 12/437*      (2006.01)
(Continued)

(52) U.S. Cl.
CPC .......... *H04L 12/437* (2013.01); *H04L 41/0803* (2013.01); *H04L 69/40* (2013.01); *H04L 41/06* (2013.01)

(58) Field of Classification Search
None
See application file for complete search history.

(56) References Cited

U.S. PATENT DOCUMENTS 6,038,678 A * 3/2000 Fukushima et al. ........... 714/4.1
6,163,527 A * 12/2000 Ester et al. .................... 370/228
(Continued)

FOREIGN PATENT DOCUMENTS

CN         1230065 A     9/1999

OTHER PUBLICATIONS

ITU-T G.842, Interworking of SDH network protection architectures, prepared by ITU-T Study Group 15 (1997-2000), approved under the WTSC Resolution No. 1 procedure on Apr. 8, 1997, the 6.2.1 section, the 6.2.2.1 section, figure 17.
(Continued)

*Primary Examiner* — Bob Phunkulh
(74) *Attorney, Agent, or Firm* — Ling Wu; Stephen Yang; Ling and Yang Intellectual Property

(57) ABSTRACT

A method and system for service protection based on the Dual Node Interconnection (DNI) protection structure in the transport network are provided. When creating a DNI protection group, a plurality of services are configured in one direction, wherein one is a working service, and the others are protection services; the multiple services have the same add node and drop node, but not exactly the same passed interconnection nodes; on each interconnection node of the add ring, two services in the DNI protection group through the local node to the drop ring are adapted as two services in a 1+1 protection group; on the drop node, services in the DNI protection group are adapted as two services in a 1+1 protection group transmitted from two directions of the drop ring; when a fault occurs, said interconnection node and drop node execute switching according to the 1+1 protection protocol.

22 Claims, 14 Drawing Sheets

(51) Int. Cl.
 *H04L 29/14* (2006.01)
 *H04L 12/24* (2006.01)

(56) References Cited

U.S. PATENT DOCUMENTS

| | | | |
|---|---|---|---|
| 6,956,816 B1* | 10/2005 | Alexander et al. | 370/222 |
| 7,342,873 B1* | 3/2008 | Nagarajan | 370/217 |
| 7,356,258 B1* | 4/2008 | Weverka et al. | 398/59 |
| 7,715,713 B1* | 5/2010 | Iyer et al. | 398/58 |
| 2003/0026281 A1 | 2/2003 | Limaye et al. | |
| 2003/0043736 A1* | 3/2003 | Gonda | 370/218 |
| 2006/0210274 A1* | 9/2006 | Lichtman et al. | 398/83 |
| 2007/0014573 A1* | 1/2007 | Wei et al. | 398/59 |
| 2010/0312878 A1* | 12/2010 | Vladescu et al. | 709/224 |

OTHER PUBLICATIONS

International Search Report for PCT/CN2010/071669 dated Oct. 14, 2010.

* cited by examiner

```
┌─────────────────────────────────────────────────────────┐
│ When creating a DNI protection group based the DNI       │─── 10
│ protection structure in the management plane, a plurality│
│ of services are configured in one direction, wherein,    │
│ one is the working service, and the others are the       │
│ protection services, the multiple services have the same │
│ add node and drop node, but not exactly the same passed  │
│ interconnection nodes                                    │
└─────────────────────────────────────────────────────────┘
                            │
                            ▼
┌─────────────────────────────────────────────────────────┐
│ On the two interconnection nodes on the add ring, the    │─── 20
│ two services in the DNI protection group transferred     │
│ through the local node to the drop ring are adapted as   │
│ one 1+1 protection group; on the drop node, the services │
│ in the DNI protection group coming from the two          │
│ directions of the drop ring are adapted as one 1+1       │
│ protection group                                         │
└─────────────────────────────────────────────────────────┘
                            │
                            ▼
┌─────────────────────────────────────────────────────────┐
│ During a fault, the interconnection nodes and the drop   │─── 30
│ node perform the switching in accordance with the 1+1    │
│ protection protocol to achieve protection for the        │
│ services in the DNI protection group                     │
└─────────────────────────────────────────────────────────┘
                            │
                            ▼
┌─────────────────────────────────────────────────────────┐
│ In the process of processing the protection switching    │─── 40
│ event, the drop node determines the interconnection nodes│
│ on the add ring node that the service connected to the   │
│ local node in the DNI protection group passes, and from  │
│ the signal sent from the interconnection node, it        │
│ acquires the service in the DNI protection group that is │
│ connected to the interconnection node and transmitted to │
│ the drop ring, and determines the service as the         │
│ currently connected service                              │
└─────────────────────────────────────────────────────────┘
```

FIG. 2

| APS signaling format | | | |
|---|---|---|---|
| | | Extended information | |
| 1 | 2 | 3 | 4 |
| 1 2 3 4 5 6 7 8 | 1 2 3 4 5 6 7 8 | 1 2 3 4 5 6 7 8 | 1 2 3 4 5 6 7 8 |
| Request type / Protection type | Requested signal | Destination node ID (Only extend to the node ID in the 1+1 protection) | Local node attribute |
| A B D R | | | |

FIG. 4

METHOD AND SYSTEM FOR SERVICE PROTECTION

TECHNICAL FIELD

The present invention relates to a method and system for service protection, and more especially, to a method and system for service protection based on the dual node interconnection structure in the transport network.

BACKGROUND OF THE RELATED ART

In the ITU-T G.842 standard recommendations, a DNI protection structure is proposed. FIG. 1 shows the basic network topology of the DNI protection structure, wherein, the node A and the node F can be used as the add node and the drop node respectively, the nodes B, C and A are on the same ring, the nodes D, E and F are on the other ring, two rings are interconnected by dual nodes, the nodes B~E connecting the two rings are known as the interconnection nodes. In the DNI protection structure, the two rings might also have other nodes.

In each transmission direction of the DNI protection structure, the signal is transferred along both sides of the first ring from the add node (also can be called as a source node). When the dual-transferred signals reach an interconnection node, they drop at the node and continue to transfer to another interconnection node. In this way, each interconnection node can choose one of the two signals from different routes on the ring. Subsequently, the output of each interconnection node is transferred to the interconnection nodes on the second ring (also known as the drop ring). Each interconnection node on the second ring obtains and transmits the corresponding signal to the drop node (also called as the destination node or host node). Finally, the drop node selects one of the two signals coming from both directions along the second ring to drop. Due to the symmetry of this structure, two interconnection nodes are completely equivalent. In the context, the first ring where the add node is located is called as the add ring, the second ring where the drop node is located is called as the drop ring.

In the prior art, there is no available service protection method proposed based on the abovementioned DNI protection structure.

SUMMARY OF THE INVENTION

The technical problem to be solved in the present invention is to provide a method and system for service protection based on the dual node interconnection (DNI) protection structure in the transport network to accomplish the protection capability of the DNI protection structure.

In order to solve the aforementioned problem, the present invention provides a method for service protection, comprising:

when creating a dual node interconnection (DNI) protection group based on a DNI protection structure, configuring a plurality of services in one direction, wherein, one of the services is a working service, and the others are protection services, the multiple services have a same add node and drop node, but not exactly same passed interconnection nodes;

on each interconnection node on an add ring, adapting two services in the DNI protection group transferred through the local node to a drop ring as two services in a 1+1 protection group; on a drop node, adapting the services of the DNI protection group as two services in the 1+1 protection group coming from two directions of the drop ring; and during a fault, the interconnection nodes and the drop node performing switching in accordance with 1+1 protection protocol to protect the services in the DNI protection group;

so as to achieve the service protection based on the DNI protection structure in a transport network.

The transport network is an optical transport network, in the step of creating a DNI protection group based on the DNI protection structure, a management plane configuring four services in one direction for each DNI protection structure, wherein, one service is the working service, and the other three are the protection services.

During a fault, the step of the interconnection nodes and the drop node performing switching in accordance with 1+1 protection protocol comprises: after each interconnection node on the add ring detects a fault alarm related to the DNI protection group, performing the switching in accordance with the 1+1 protection protocol;

an alarm waiting time of a single board being set on the drop node, when the drop node detects a fault alarm related to the DNI protection group, it starting a timer to time, and before the timing reaches the alarm waiting time, if the fault is detected as disappeared, no switching being executed, otherwise, after the timing reaches the alarm waiting time, performing the switching in accordance with the 1+1 protection protocol.

The step of the switching comprises: the drop node determining an interconnection node on the add ring that a service connected to the local node in the DNI protection group passes, acquiring a service in the DNI protection group that is connected to the interconnection node and transferred to the drop ring from signaling sent from the interconnection node, and determining the service as the currently connected service.

The step of adapting the two services in the DNI protection group transferred through the local node to the drop ring as the two services in the 1+1 protection group on each interconnection node on the add ring comprises: changing attributes of the two services from pass-through services to drop services, and changing the drop node of the two services to be the local node;

the step of adapting the services in the DNI protection group as the two services of the 1+1 protection group on the drop node comprises: taking two interconnected nodes on the drop ring as the add nodes of the two services in the 1+1 protection group respectively, and taking the local node as the drop nodes of the two services in the 1+1 protection group.

The method also comprises: configuring the interconnection node on the add ring that the working service in the DNI protection group passes as a master node, and configuring the other interconnection node on the add ring as a slave node;

the step of adapting the two services in the DNI protection group that are transferred through the local node to the drop ring as the two services in the 1+1 protection group on each interconnection node on the add ring comprises:

when adapting the two services in the DNI protection group transferred through the local node to the drop ring as the two services in the 1+1 protection group on the master node, adapting the working service in the DNI protection group as the working service in the 1+1 protection group, and adapting the protection services in the DNI protection group as the protection services in the 1+1 protection group; and on the slave node, adapting the two protection services in the DNI protection group transferred through the local node to the drop ring as the working service and the protection service in the 1+1 protection group respectively;

the step of adapting the services in the DNI protection group as the two services in the 1+1 protection group transferred from the two directions of the drop ring on the drop node comprises:

on the drop node, taking one service in the 1+1 protection group in the same direction from which the working service in the DNI protection group is transferred as the working service in the 1+1 protection group.

The method also comprises: after the node in the master node and the slave node that performs the switching, it sends a first automatic protection switching (APS) signal to the drop node as a service connected notification, wherein, the first APS signal carries identification information of the service in the DNI protection group that is currently connected to the local node and sent to the drop ring;

after the drop node receives the first APS signal sent to the local node, if it is the working service in the DNI protection group that is currently connected to the local node, the drop node processing the first APS signal sent by the master node, if it is the protection service in the DNI protection group that is currently connected to the local node, the drop node processing the first APS signal sent by the slave node; the drop node determining the service in the DNI protection group that is identified by the identification information in the processed first APS signal as the currently connected service.

The method also comprises: after the drop node executes the switching, if it is the working service in the DNI protection group that is currently connected to the local node and the first APS signal sent by the master node is not received, sending a second APS signal to the master node to query the connected service; if it is the protection service in the DNI protection group that is currently connected to the local node and the first APS signal sent by the slave node is not received, sending a second APS signal to the slave node; after the master node or the slave node receives the second APS signal, if the first APS signal has not been sent, sending the first APS signal to the drop node; alternatively, after the drop node executes the switching, if it is the working service in the DNI protection group that is currently connected to the local node, sending a second APS signal to the master node to query the connected service, if it is the protection service in the DNI protection group that is currently connected to the local node, sending a second APS signal to the slave node; after the master node or the slave node receives the second APS signaling, it sends the first APS signal to the drop node;

the method also comprises: after the drop node receives the first APS signal, which carries identification information of the service in the DNI protection group that is currently connected to the local node and sent to the drop ring, from the query node, it determines the service in the DNI protection group that is identified by the identification information in the first APS signal as the currently connected service.

The method also comprises: after the drop node determines the currently connected service, if the currently connected service is different from the previously connected service, recording the currently connected service and reporting it to a management plane of the transport network.

The first APS signal also carries the identification information of the destination node and node attribute information used to indicate whether the local node is a master node or a slave node, wherein, the destination node is the drop node;

the method also comprises: after the drop node receives the first APS signal, it determines that the signal is the APS signal sent to the local node according to the identification information of the destination node in the first APS signal, and determining whether a sender of the first APS signal is the master node or the slave node according to the node attribute information in the first APS signal.

Bridged signal information is not filled in the first APS signal, the identification information of the destination node uses an information unit where the bridged signal information is located, and the node attribute information uses a reserved bit in the APS signal; alternatively, the bridged signal information is not filled in the first APS signal, the node attribute information uses the information unit where the bridged signal information is located, and the identification information of the destination node uses the reserved bit in the APS signal.

The service protection system provided in the present invention comprises a plurality of nodes in the DNI protection structure and a corresponding management plane, wherein:

the management plane is set to: when creating a DNI protection group based on the DNI protection structure, configure a plurality of services in one direction, wherein, one of the services is the working service, and the others are the protection services, the plurality of services have a same add node and drop node, but not exactly same passed interconnection nodes;

each interconnection node on the add ring on which the add node is located is set to: adapt two services in the DNI protection group transferred through this node to a drop ring as two services in a 1+1 protection group; during a fault, perform switching according to 1+1 protection protocol;

the drop node is set to: adapt the services in the DNI protection group as the two services in the 1+1 protection group that are transferred through the two directions of the drop ring; during a fault, perform the switching according to the 1+1 protection protocol;

so as to achieve the service protection based on the DNI protection structure in a transport network.

The transport network is an optical transport network;

the transport network is an optical transport network;

the management plane is set to: for each DNI protection structure, configure four services in one direction for each DNI protection structure, wherein, one service is the working service, and the other three are the protection services;

the interconnection node on the add ring is set to: when adapting the two services in the DNI protection group transferred through the local node to the drop node as the two services in the 1+1 protection group, change attributes of the two services from pass-through services to drop services, and change the drop nodes of the two services to be the local node;

the drop node is set to: when adapting the services in the DNI protection group as the two services in the 1+1 protection group, take two interconnected nodes on the drop ring as the add nodes of the two services in the 1+1 protection group respectively, and take the local node as the drop node of the two services in the 1+1 protection group.

the management plane is also set to configure the interconnection node on the add ring that the working service in the DNI protection group passes as the master node, and configure the other interconnection node on the add ring as the slave node;

the master node is set to: when adapting the two services in the DNI protection group that are transferred through the local node to the drop ring as the two services in the 1+1 protection group, adapt the working service in the DNI protection group as the working service in the 1+1 protection group, and adapt the protection services in the DNI protection group as the protection services in the 1+1 protection group;

the slave node is set to adapt the two services in the DNI protection group transferred through the local node to the drop ring as the working service and the protection service in the 1+1 protection group;

the drop node is set to: take one service in the 1+1 protection group in the same direction of transferred the working service in the DNI protection group as the working service in the 1+1 protection group.

The master node and the slave node are also set to: after performing the switching, send a first automatic protection switching (APS) signal to the drop node, the first APS signal carries the identification information of the service in the DNI protection group that is currently connected to the local node and sent to the drop ring;

the drop node is also set to: after receiving the first APS signal sent to the local node, if it is the working service in the DNI protection group that is currently connected to the local node, process the first APS signal sent by the master node, otherwise, process the first APS signal sent by the slave node; and determine the service in the DNI protection group that is identified by the identification information in the processed first APS signal as the currently connected service.

The drop node is also set to: after executing the switching, if it is the working service in the DNI protection group that is currently connected to the local node and the first APS signal sent by the master node is not received, send a second APS signal to the master node to query the connected service; if it is the protection service in the DNI protection group that is currently connected to the local node and the first APS signal sent by the slave node is not received, send a second APS signal to the slave node; and, after receiving the first APS signal returned by the query node, determine the service in the DNI protection group identified by the identification information in the first APS signal as the currently connected service;

the master node and the slave node are also set to: after receiving the second APS signaling, if the first APS signal has not been sent, send the first APS signal to the drop node, and the first APS signal carries the identification information of the service in the DNI protection group that is connected to the local node and sent to the drop ring.

The first APS signal sent by the master node and the slave node also carries the identification information of the destination node and node attribute information used to indicate whether the local node is a master node or a slave node, wherein, the destination node is the drop node;

the drop node is also set to: after receiving the first APS signal, determine the signal as the APS signal sent to the local node according to the identification information of the destination node in the APS signal, and determine whether a sender of the first APS signal is the master node or the slave node according to the node attribute information in the APS signal; and when the determined currently connected service is different from the previously connected service, record the currently connected service and report it to a management plane.

In the abovementioned method and system for service protection based on the DNI protection structure, by creating a DNI protection group in the management plane and adapting the services in the DNI protection group as the 1+1 protection group on the interconnection nodes and the drop node, the reliable protection of the services in the DNI protection group is achieved through the linkage of the 1+1 protection of these nodes. Furthermore, in the process of processing the protection-switching event (PSE), the information in the APS signal can be extended to inform the management plane of the choice of the switching route.

BRIEF DESCRIPTION OF DRAWINGS

FIG. 2 is a schematic diagram of processing the service adaptation in the DNI protection structure.

FIG. 4 is a schematic diagram of the APS signal structure.

PREFERRED EMBODIMENTS OF THE PRESENT INVENTION

In the following, the present invention will be described in further detail with combination of specific embodiments and the accompanying drawings.

In this embodiment, based on the DNI protection structure of the optical transport network, a DNI protection group is created in the management plane, the interconnection nodes and the drop node on the add ring adapt multiple services passing the local node as a 1+1 protection group, each node performs the switching through the 1+1 protection protocol, and the services in the DNI protection group are protected through the linkage of the nodes. In the process of processing the PSE, the information in the automatic protection switching (APS) signal is extended to notify the management plane of the choice of the switching route. It should be noted that although this embodiment is applied to the optical transport network, those skilled in the field should understand that the method and the system in the embodiment could also be applied to any other transport network having the DNI protection structure.

As shown in FIG. 2, the process of the service protection method in this embodiment comprises the following steps.

Step 10, when creating a DNI protection group based the DNI protection structure, a plurality of services are configured in one direction, wherein, one is the working service, and the others are the protection services, the multiple services have the same add node and drop node, but not exactly the same passed interconnection nodes.

The DNI protection structure has two transmission directions, and in either direction can a DNI protection group be created. In the application example shown in FIG. 1, for each DNI protection structure, 4 services are configured in one direction, wherein, one service is the working service, and the other three are the protection services. Therefore, the protection capability of the DNI protection structure mentioned in the ITU-TG.842 can be fully realized. FIG. 4 uses four different dashed lines to indicate the routes of four different services in the DNI protection group, wherein, the route of the working service is A->B->D->F, and the protection routes of the other three protection services are: A->B->C->E->F; A->C->B->D->F; A->C->E->F.

Figure 1:
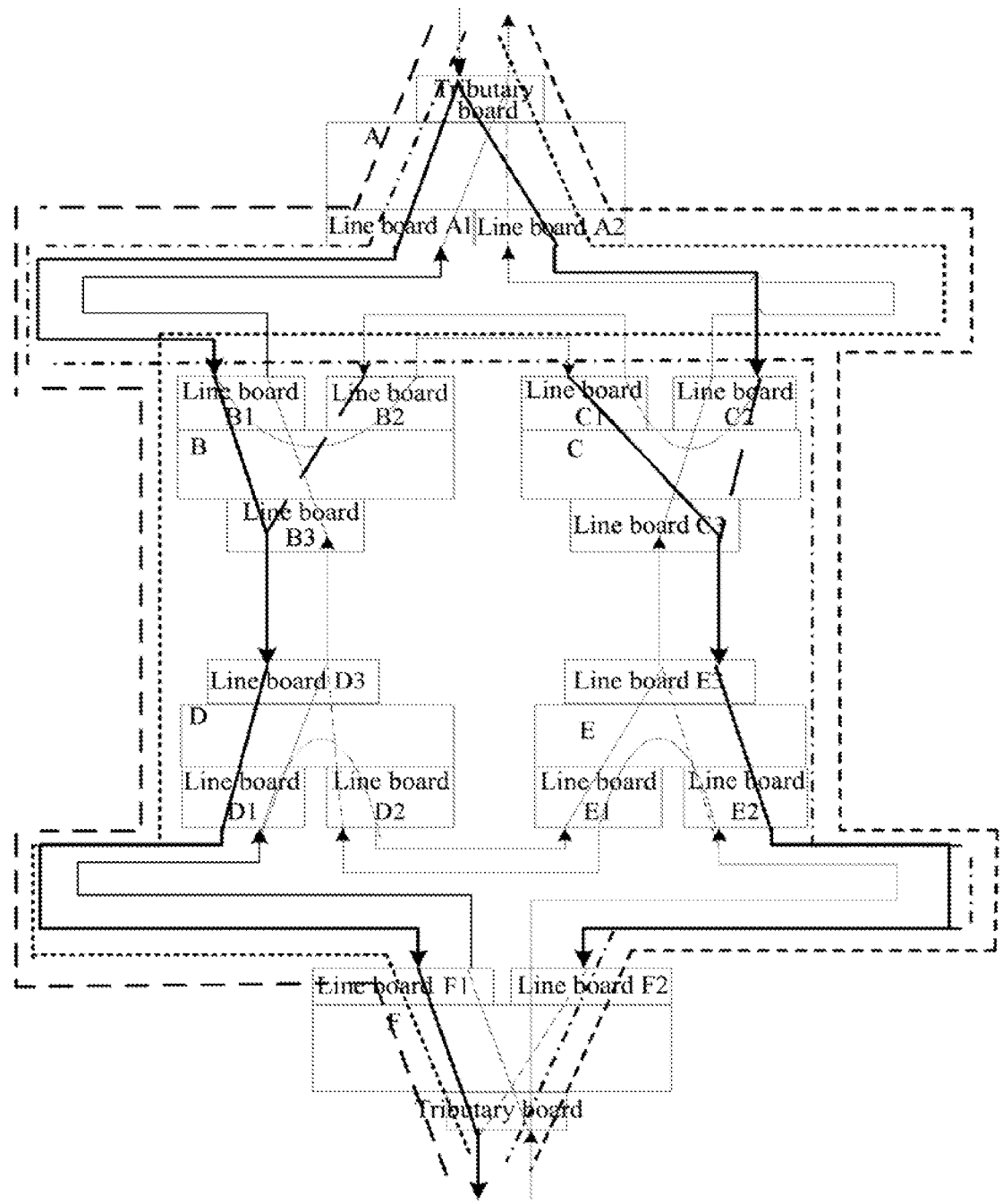
FIG. 1 is a topology diagram of the DNI protection structure as well as a schematic diagram of the configured DNI protection group.

Although the FIG. 1 only shows one DNI protection structure, multiple parallel DNI protection structures can be connected between one add node and one drop node. Therefore, the number of services configured in one direction can be more than four, and it can be determined specifically based on the DNI protection type.

Step 20, on the two interconnection nodes on the add ring, the two services in the DNI protection group transferred through the local node to the drop ring are adapted as one 1+1 protection group; on the drop node, the services in the DNI protection group coming from the two directions of the drop ring are adapted as one 1+1 protection group.

In this embodiment, one interconnection node on the add ring passed by the working service in the DNI protection group is configured as the master node, and the other interconnection node on the add ring is configured as the slave node.

When the two services in the DNI protection group that are transferred through the local node to the drop ring are adapted as the two services in the 1+1 protection group, the working service in the DNI protection group is adapted as the working service in the 1+1 protection group, and the protection services in the DNI protection group is adapted as the protection services in the 1+1 protection group.

On the slave node, the two protection services in the DNI protection group transferred through the local node to the drop ring are adapted as the working service and the protection service in the 1+1 protection group respectively.

When performing the aforementioned adaptation on the master node and the slave node, it needs to change the attributes of the two services in the DNI protection group from pass-through services to drop services, and change the drop nodes of the two services to be the local node, to adapt to the requirements of the current 1+1 protection protocol. In the drop node, when adapting the services in the DNI protection group coming from the two directions of the drop ring as the 1+1 protection group, two interconnected nodes on the drop ring can be taken as the add nodes of the two services in the 1+1 protection group respectively, and this drop node is taken as the drop node of the two services in the 1+1 protection group. When dividing the working service and the protection services, the one service in the same direction of transmitting the working service in the DNI protection group is taken as the working service in the 1+1 protection group.

In the application example, the aforementioned adaptation method is used to adapt the services in the DNI protection group shown in FIG. 1, the node B is the master node, the node C is the slave node, and the node F is the drop node, wherein:

there are two services in the DNI protection group transferred through the Node B to the drop ring: the working service whose ID=1: A->B->C->E->F, and the protection service whose ID=2: A->C->B->D->F. Two services in the 1+1 protection group from the node A to the node B are adapted from these two services: the working service A->B and the protection service A->C->B. The ID of the service before and after the adaptation can remain unchanged, if it is changed, the service ID of the 1+1 protection group should be associated with the service ID of the DNI protection group.

There are two services in the DNI protection group transferred through the node C to the drop ring: the protection service whose ID=3: A->C->B->D->F and the protection service whose ID=4: A->C->E->F. Adapt these two DNI protection services as the two services in the 1+1 protection group from the node A to the node C: the working service A->B->C and the protection service A->C, they also can be adapted as the working service A->C and the protection service A->B->C.

There are four services in the DNI protection group on the node F: the working service A->B->D->F, the protection services A->B->C->E->F, A->C->B->D->F and A->C->E->F. Adapt the four DNI protection services as the two services in the 1+1 protection group which takes the node F as the drop node: the working service D->F and the protection service E->F, these two services are transmitted to the node F from different directions of the ring and access to different line boards on the node F.

Step 30, during a fault, the interconnection nodes and the drop node perform the switching in accordance with the 1+1 protection protocol to achieve protection for the services in the DNI protection group.

In this embodiment, an alarm waiting time, also called the Hold-off alarm waiting time, is set on the drop node. When the drop node detects a fault alarm related to the DNI protection group and performs the switching, it starts the timer to time, and before the timing reaches the alarm waiting time, if the fault is detected as disappeared, no switching is processed, otherwise, after the timing reaches the alarm waiting time, perform the switching in accordance with the 1+1 protection protocol. That is, in the alarm waiting time, if the upper layer protection starts to take effect, the service returns to normal, and no alarm is reported for the transient interruptions in the waiting period. When performing the switching, if the fault results in the interruption of the work route in the 1+1 protection group, the switching will be performed.

Step 40, in the process of processing the protection switching event, the drop node determines the interconnection nodes on the add ring node that the service connected to the local node in the DNI protection group passes, and from the signal sent from the interconnection node, it acquires the service in the DNI protection group that is connected to the interconnection node and transmitted to the drop ring, and determines the service as the currently connected service.

In this embodiment, according to whether the drop node performs the switching or not, the process of the drop node obtaining the connected service information from the interconnection node to determine the currently connected service is divided into the following two cases.

In the first case, the drop node does not switch and does not send the APS signal.

After the one node of the master node and the slave node that performs the switching, it sends a first automatic protection switching (APS) signal to the drop node as a service connected notification, the first APS signal carries the identification information of the service in the DNI protection group that is currently connected to the local node and sent to the drop ring;

after the drop node receives the first APS signal sent to the local node, if the service currently connected to the local node is the working service in the DNI protection group, the drop node processes the first APS signal sent by the master node, if it is the protection service in the DNI protection group that is currently connected to the local node, the drop node processes the first APS signal sent by the slave node; the drop node determines the service in the DNI protection group that is identified by the identification information in the processed first APS signal as the currently connected service.

The service connected to the local node in the context means that the route of the service on the local node is connected, and it does not mean that the whole route of the service is connected. The currently connected service as set forth in the above description means that the whole route of this service is connected.

The second case: the drop node performs the switching, at this time, the master node or the slave node might switch or not.

After the drop node executes the switching, if it is the working service in the DNI protection group that is currently connected to the local node and the first APS signal sent by the master node is not received, send a second APS signal to the master node to query the connected service; if it is the protection service in the DNI protection group that is currently connected to the local node and the first APS signal sent by the slave node is not received, send a second APS signal to the slave node;

after the master node or the slave node receives the second APS signal, if the first APS signal has not been sent, it sends the first APS signal to the drop node, and the APS signal carries the identification information of the service in the DNI protection group that is currently connected to the local node and transmitted to the drop ring;

after the drop node receives the first APS signal returned by the query node, it determines the service in the DNI protection group identified by the identification information in the first APS signal as the currently connected service.

In another embodiment, it might also be: after the drop node executes the switching, if it is the working service in the DNI protection group that is currently connected to the local node, it sends a second APS signal to the master node to query the connected service; otherwise, it sends a second APS signal to the slave node; after the master node or the slave node receives the second APS signal, it sends the first APS signal to the drop node; after the drop node receives the first APS signal returned by the query node, the processing is as the above description.

The APS signal in the current protocol cannot support the aforementioned functions, therefore, the first APS signal also needs to carry the identification information of the destination node and the node attribute information used to indicate whether the local node is the master node or the slave node, wherein, the destination node is the drop node; after the drop node receives the first APS signal, the signal is determined as the APS signal sent to the local node according to the identification information of the destination node therein, and the sender of the first APS signal is determined as the master node or the slave node according to the node attribute information therein.

In order to carry the aforementioned information, FIG. 4 gives a format of the extended APS signal, and the format contains information units of the request type, the protection type, the request signal and the bridged signal, and also comprises the information unit of the expanded information, the extended information comprises the identification information of the destination node and the node attribute information used to indicate whether the local node is the master node or the slave node. In the FIG. 4, the identification information of the destination node and the bridged signal information use the same information unit, and the identification information of the destination node is filled in during the 1+1 protection, and the node attribute information uses the original reserved bit in the APS signal; that in, the bridged signal information is not filled in the first APS signal, the identification information of the destination node uses the information unit where the bridged signal information is located.

Of course, in the APS signal, the node attribute information and the bridged signal information might use the same information unit, and the node attribute information is filled in during the 1+1 protection, and the identification information of the destination node uses the original reserved bit in the APS signal. At this point, the bridged signal information is not filled in the first APS signal, and the node attribute information uses the information unit where the bridged signal information is located.

In addition, when processing the protection switching event, the nodes (such as the interconnection nodes and the drop node) executing the switching are required to report the APS event to the management plane, in particular, after the drop node determines the currently connected service, if the currently connected service is different from the previously connected service, record the currently connected service and report it to the management plane in the transport network. The currently connected service might be reported individually or reported along with the APS event of the local node.

Accordingly, the service protection system based on the DNI protection structure in the transport network in the embodiment comprises a plurality of nodes in the DNI protection structure and the corresponding management plane, wherein:

the management plane is used to: when creating a DNI protection group based on the DNI protection structure, configure multiple services in one direction, wherein, one of the services is the working service, and the others are the protection services, the multiple services have the same add node and drop node, but not exactly the same passed interconnection nodes;

the interconnection nodes on the add ring in which the add node is located are used to, adapt the two services in the DNI protection group transferred through the local node to the drop ring as two services in the 1+1 protection group; during a fault, perform the switching according to the 1+1 protection protocol;

the drop node is used to, adapt the services in the DNI protection group as the two services in the 1+1 protection group that are transferred through the two directions of the drop ring; during a fault, perform the switching according to the 1+1 protection protocol.

Furthermore, when the management plane creates a DNI protection group based on the DNI protection structure, it configure four services in one direction for each DNI protection structure, wherein, one service is the working service, and the other three are the protection services;

when an interconnection node on the add ring adapts the two services in the DNI protection group transferred through the local node to the drop ring as the two services in the 1+1 protection group, it changes the attributes of the two services from through services to drop services, and changes the drop nodes of the two services to be the local node;

when the drop node adapts the services in the DNI protection group as the two services in the 1+1 protection group, it takes the two interconnected nodes on the drop ring as the add nodes of the two services in the 1+1 protection group respectively, and takes the local node as the drop node of the two services in the 1+1 protection group.

Furthermore, when the management plane creates a DNI protection group based on the DNI protection structure, it also configures the interconnection node on the add ring that the working service in the DNI protection group passes as the master node, and configures the other interconnection node on the add ring as the slave node;

when the master node adapts the two services in the DNI protection group that are transmitted through the local node to the drop ring as the two services in the 1+1 protection group, it adapts the working service in the DNI protection group as the working service in the 1+1 protection group, and adapts the protection services in the DNI protection group as the protection services in the 1+1 protection group;

the slave node adapts the two protection services in the DNI protection group transferred through the local node to the drop ring as the working service and the protection service in the 1+1 protection group;

the drop node takes one service in the 1+1 protection group in the same direction of transferring the working service in the DNI protection group to the working service in the 1+1 protection group.

Furthermore, the master node and the slave node are also used to: after performing the switching, send a first APS signal to the drop node, and the first APS signal carries the identification information of the service in the DNI protection group that is currently connected to the local node and transmitted to the drop ring;

the drop node is also used to: after receiving the first APS signal sent to the local node, if it is the working service in the DNI protection group that is currently connected to the local node, process the first APS signal sent by the master node, otherwise, process the first APS signal sent by the slave node; determine the service in the DNI protection group that is identified by the identification information in the processed first APS signal as the currently connected service.

Furthermore, the drop node is also used to: after executing the switching, if it is the working service in the DNI protection group that is currently connected to the local node and the first APS signal from the master node is not received, send a second APS signal to the master node to query the connected service; if it is the protection service in the DNI protection group that is currently connected to the local node and the first APS signal sent by the slave node is not received, send a second APS signal to the slave node; and, after receiving the first APS signal returned by the query node, determine the service in the DNI protection group identified by the identification information in the first APS signal as the currently connected service;

the master node and the slave node are also used to: after receiving the second APS signal, if the first APS signal has not been sent, send the first APS signaling to the drop node, and the first APS signal carries the identification information of the service in the DNI protection group that is currently connected to the local node and sent to the drop ring.

Furthermore, the first APS signal sent by the master node and the slave node also carries the identification information of the destination node and the node attribute information used to indicate whether the local node is the master node or the slave node, wherein, the destination node is the drop node;

after the drop node receives the first APS signal, it determines that the service is the APS signal sent to the local node according to the identification information of the destination node, and determines whether the sender of the first APS signal is the master node or the slave node according to the node attribute information in the signal; and when the determined currently connected service is different from the previously connected service, records and reports the currently connected service to the management plane.

Figure 3:
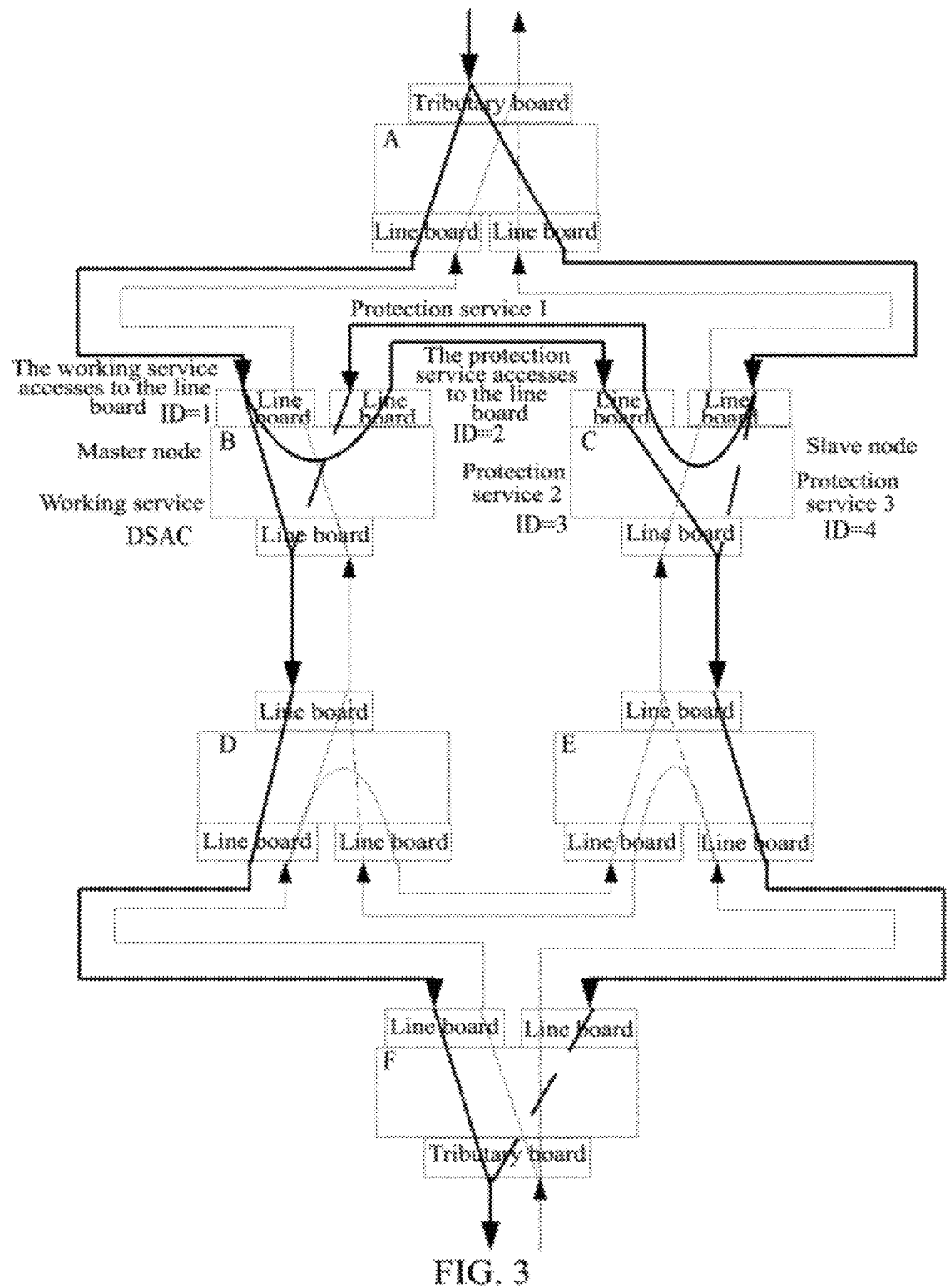
FIG. 3 is a diagram of adapting the services in the DNI protection group as the 1+1 protection group.
Figure 5:
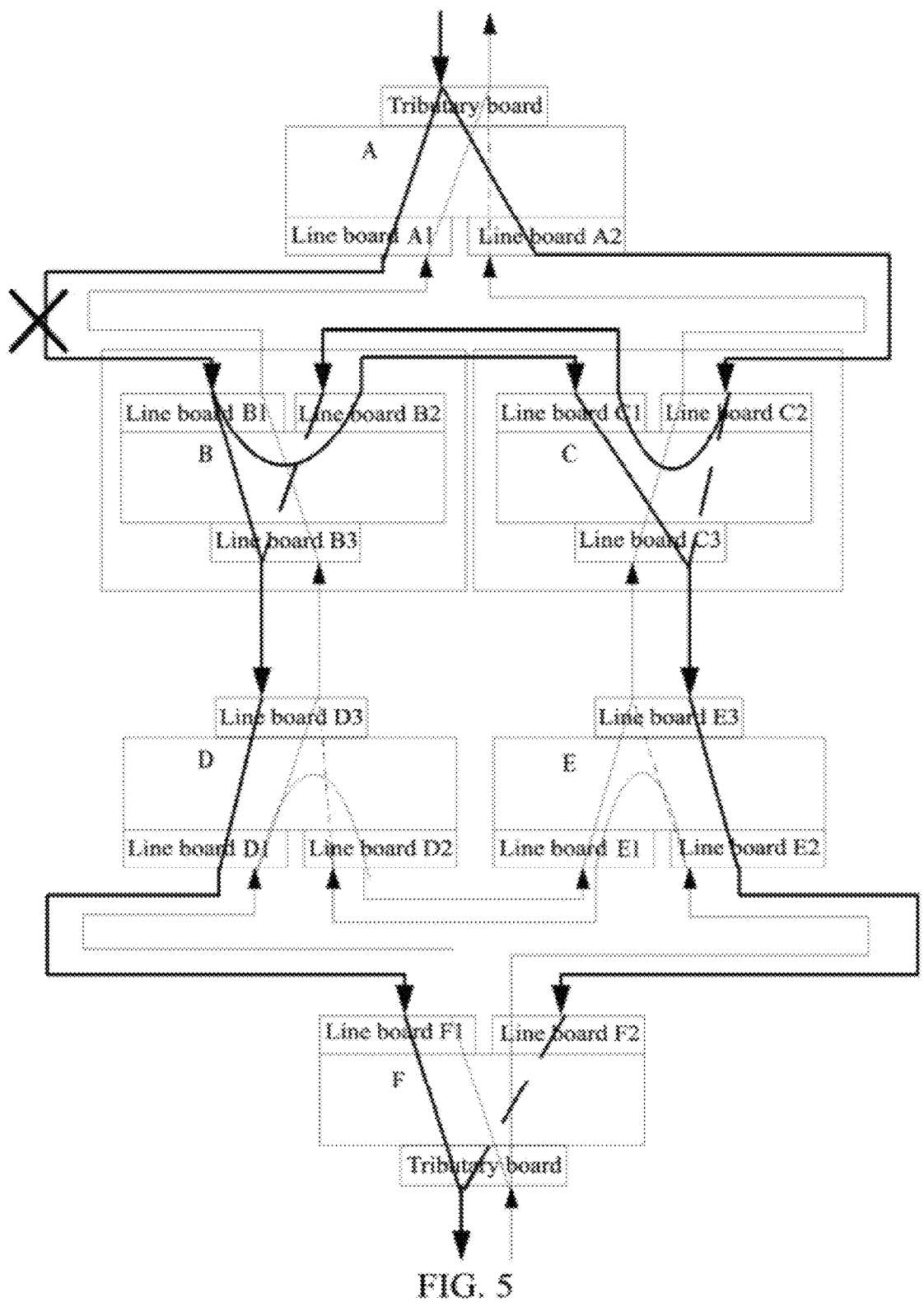
FIG. 5 is a schematic diagram when there is a fault occurred between the node A and the node B in the DNI protection structure.

In the following, the switching processing and the PSE process when several different faults occur are described based on the DNI protection structure and the corresponding protection group configuration shown in FIG. 3, assuming that the initial state is that the working service (route is A->B->D->F) carries the data:

Fault 1: the line between the add node A and the interconnection node B fails, as shown in FIG. 5.

Figure 6:
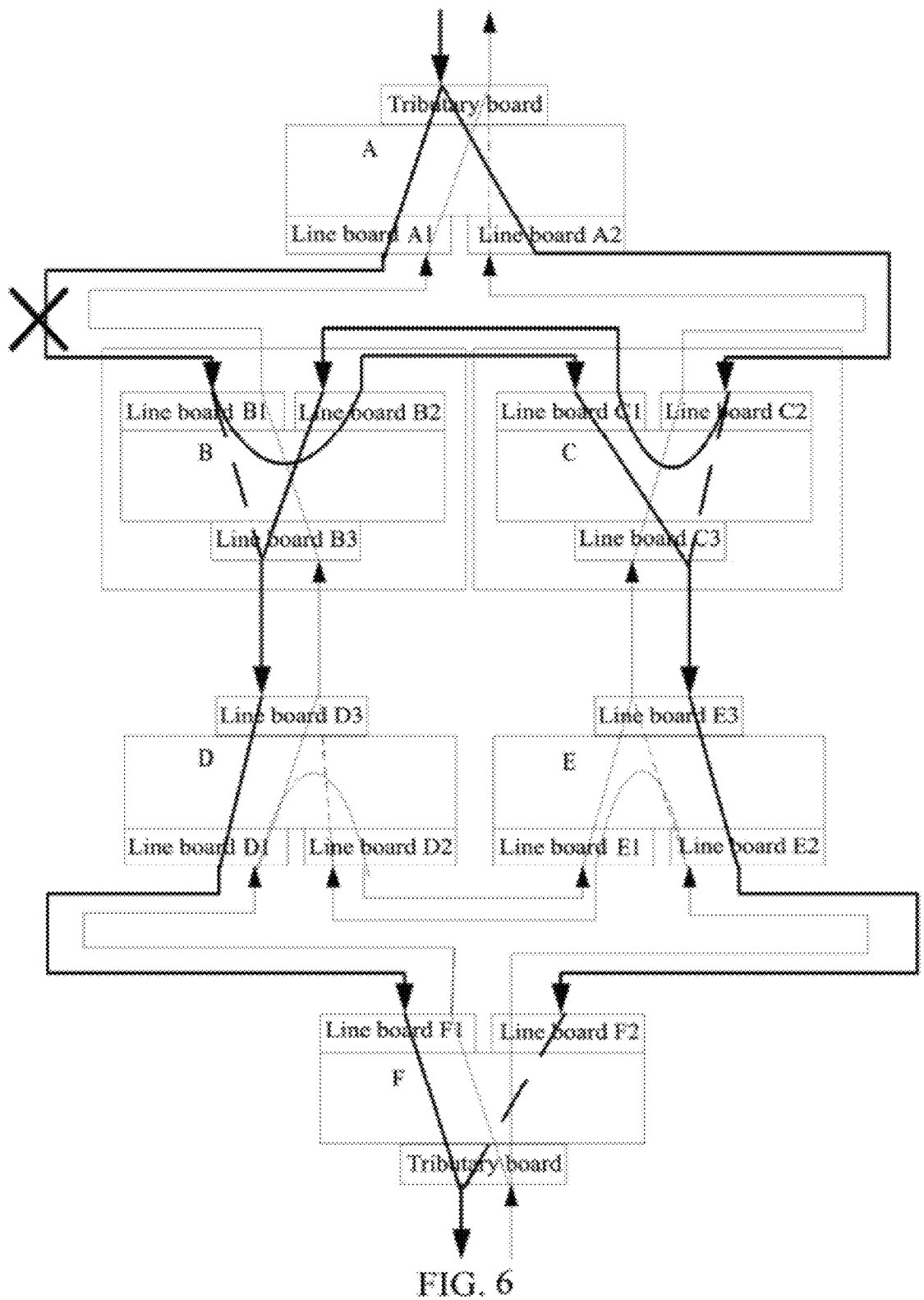
FIG. 6 is a schematic diagram of the switching action of the Node B after the fault shown in FIG. 5 occurs.

The line board that the working service on the Node B is connected to detects an alarm, in accordance with the 1+1 protection protocol, it switches from the working service A->B to the protection service A->C->B in the configured 1+1 protection group, as shown in FIG. 6.

Figure 7:
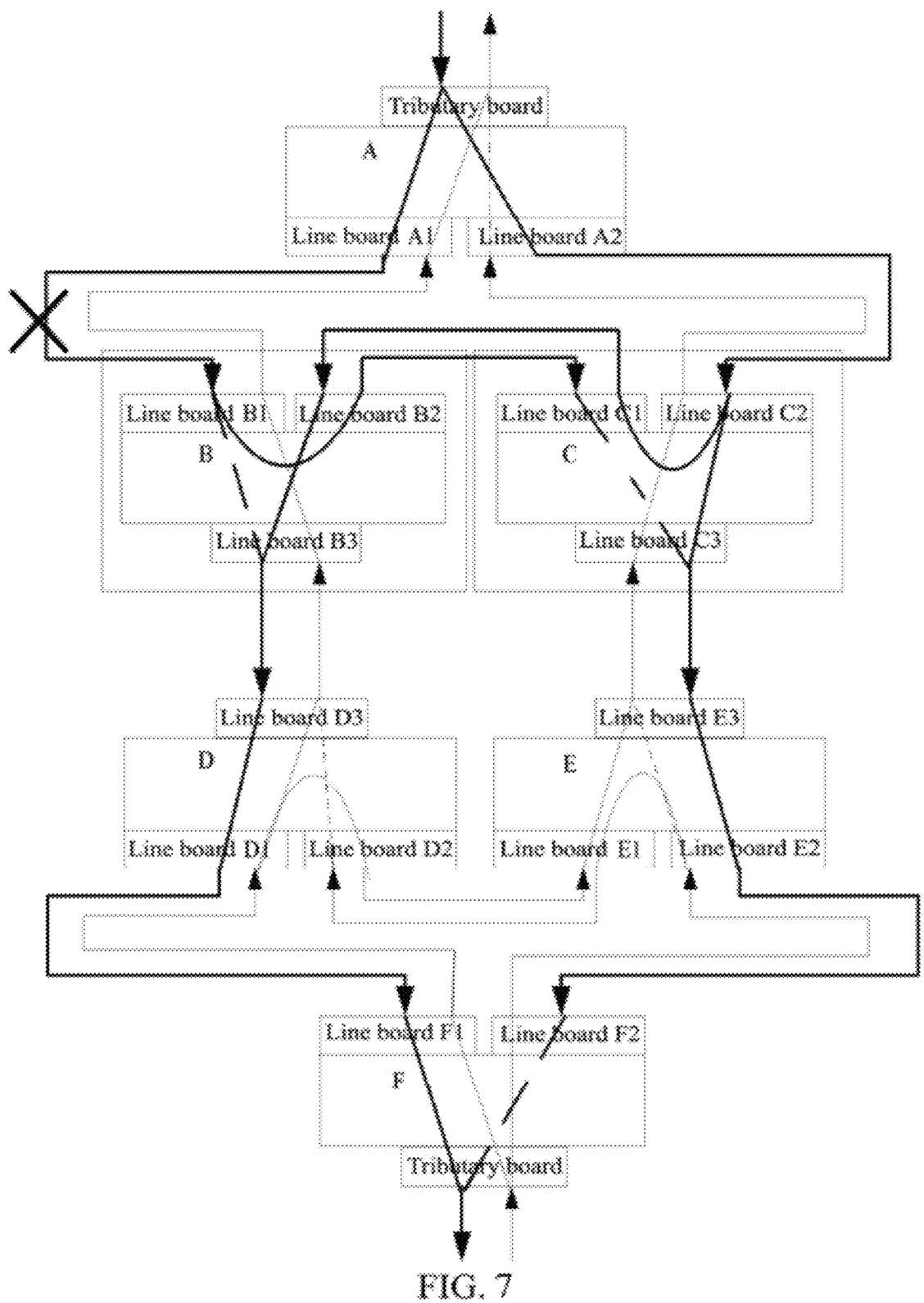
FIG. 7 is a schematic diagram of the switching action of the Node C after the fault shown in FIG. 5 occurs.

The line board that the working service on the Node C is connected to detects an alarm, in accordance with the 1+1 protection protocol, it switches from the working service A->B->C to the protection service A->C in the configured 1+1 protection group, as shown in FIG. 7.

After the line board that the working services on the Node F is connected to detects an alarm, in the Hold-off alarm waiting time, since the node B and the node C in the upstream switch, the node F will receive an alarm recover message, and no switching is performed.

The process of processing the PSE event includes: the node B sends an APS signal to the node F to notify that the current service ID is 2, and the node attribute is the master node, and the destination node ID is F; the node C sends the APS signal to the node F to notify that the current service ID is 4 and the node attribute is the slave node, and the destination node ID is F; after the node F receives the aforementioned two APS signal, it determine that the destination node ID is consistent with the local node ID, and then judge the node attribute in the APS signaling. Since the node F is connected on the working route, only the APS signal sent by the Node B is processed, and the reported currently connected service ID is 2.

Figure 8:
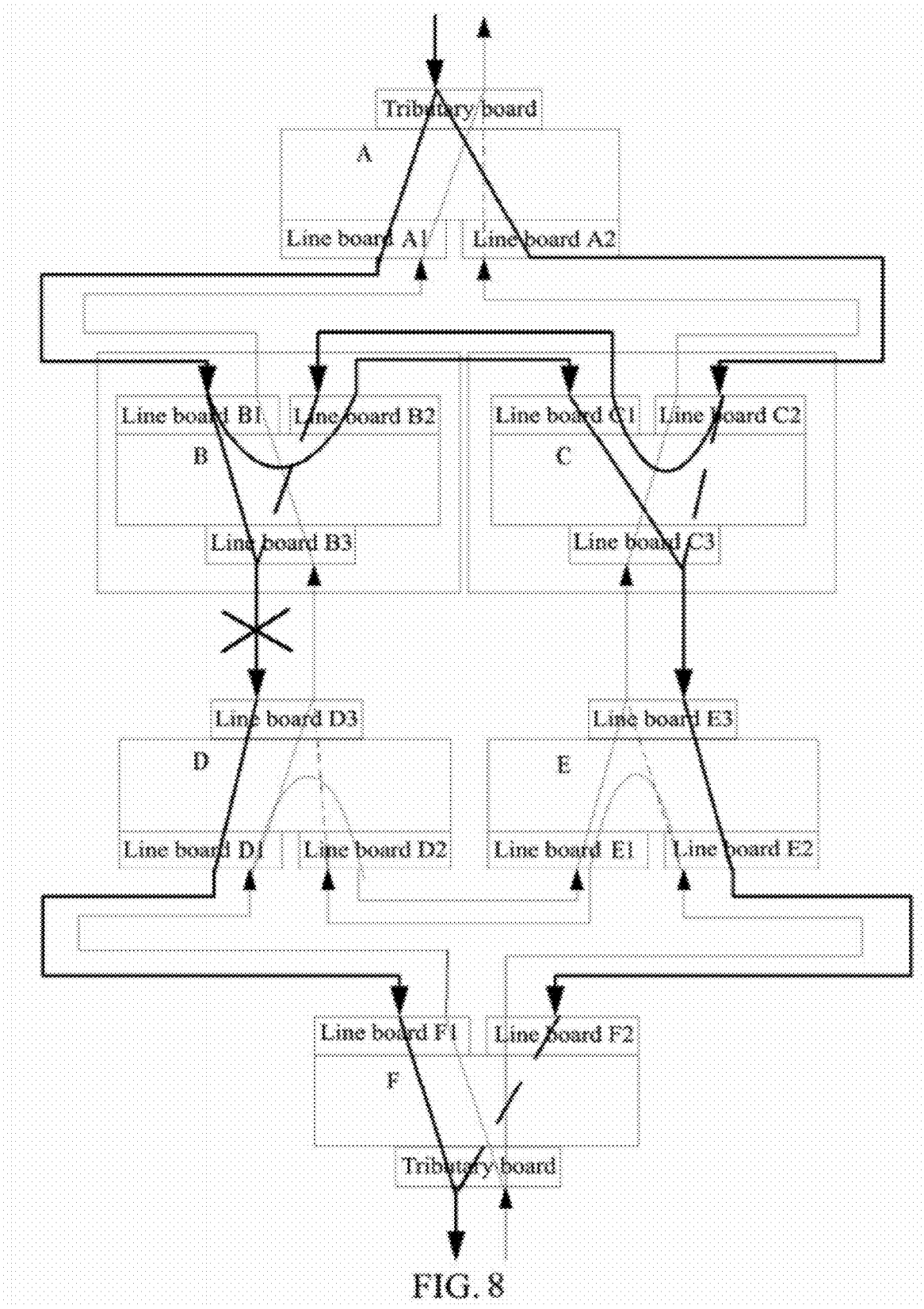
FIG. 8 is a schematic diagram that a fault occurs between the node B and the node C in the DNI protection structure.

Fault 2: the line between the interconnection nodes B and D on different rings fails, as shown in FIG. 8.

Figure 9:
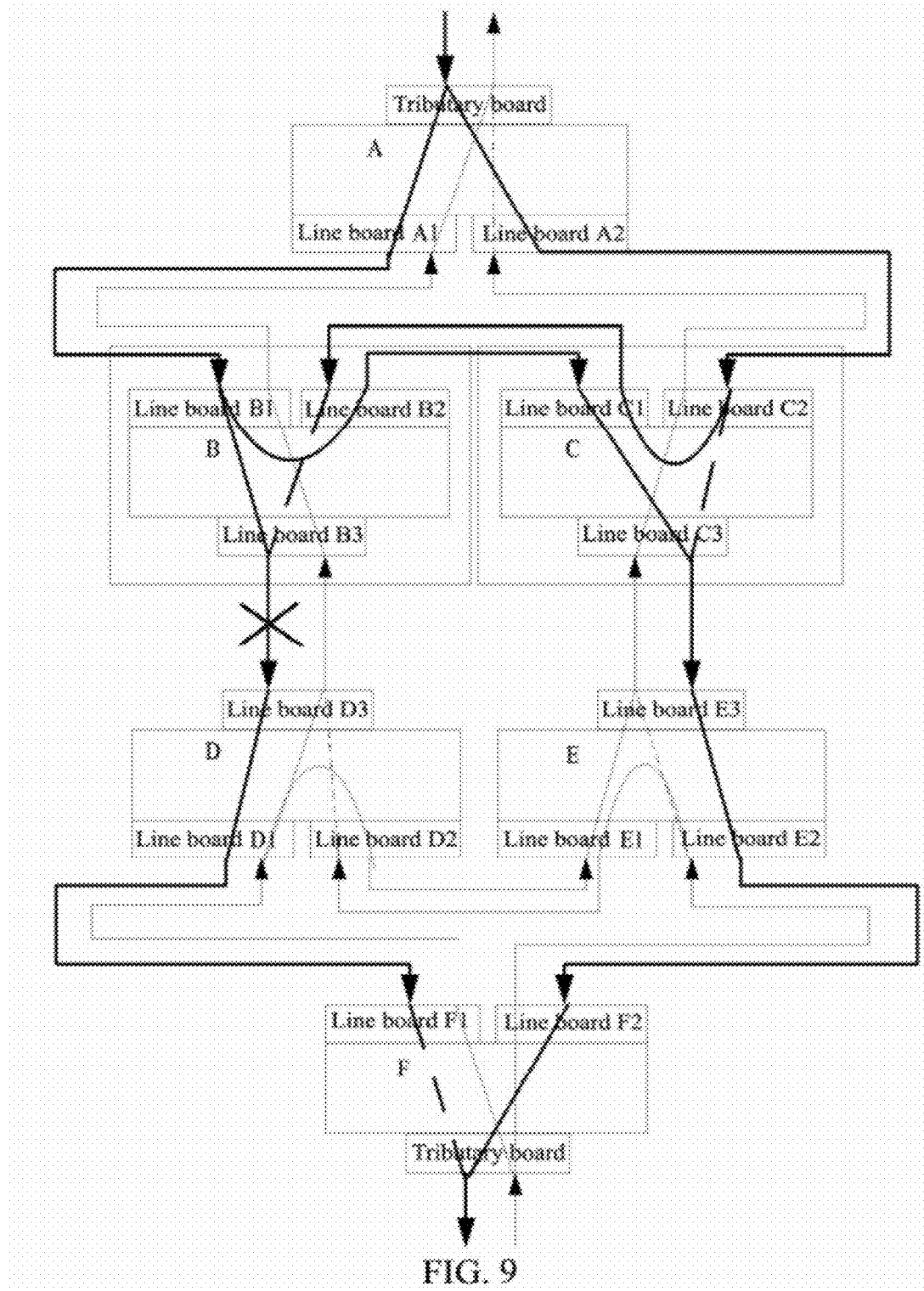
FIG. 9 is a schematic diagram of the switching action of the node F after the fault in the FIG. 8 occurs.

The line board that the working service on Node F is connected to detects an alarm, in the Hold-off alarm waiting time, the alarm does not disappear. According to the 1+1 protection protocol, the node F switches from the working service D->F to the protection service E->F in the configured 1+1 protection group, as shown in FIG. 9.

The process of processing the PSE event is: after the drop node F switches to the protection service, it sends an APS signal to the slave node C, after the slave node C receives the signal, it notifies the node F of the ID (ID=3) of the service currently connected to the local node through the APS signal. After the node F receives the APS signal, it finds that the currently connected service changes and reports the currently connected service ID (ID=3) to the management plane.

Figure 10:
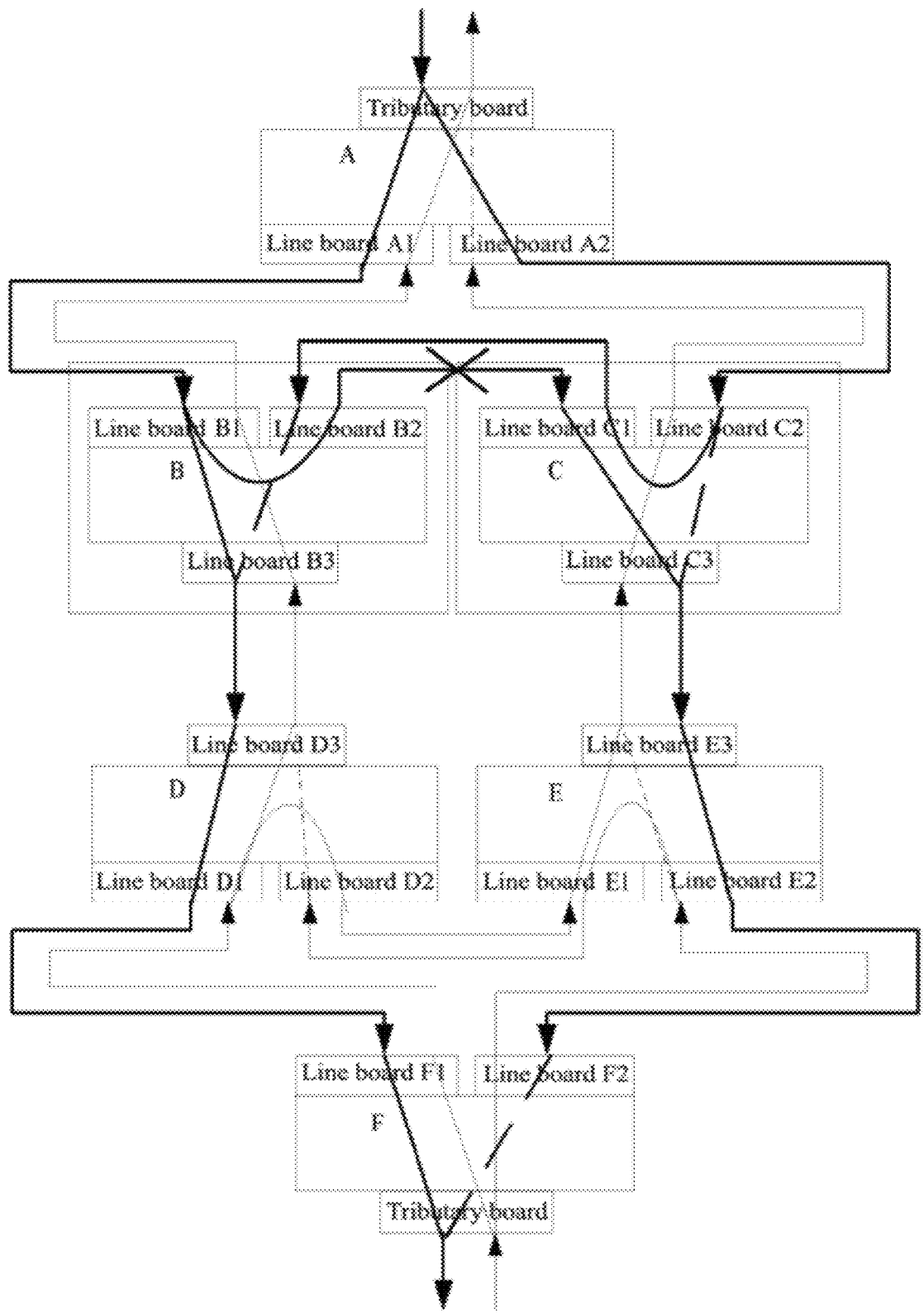
FIG. 10 is an illustration of a fault occurred between the node B and the node D in the DNI protection structure.

Fault 3, the line between the interconnection nodes B and D on the same ring fails, as shown in FIG. 10.

Figure 11:
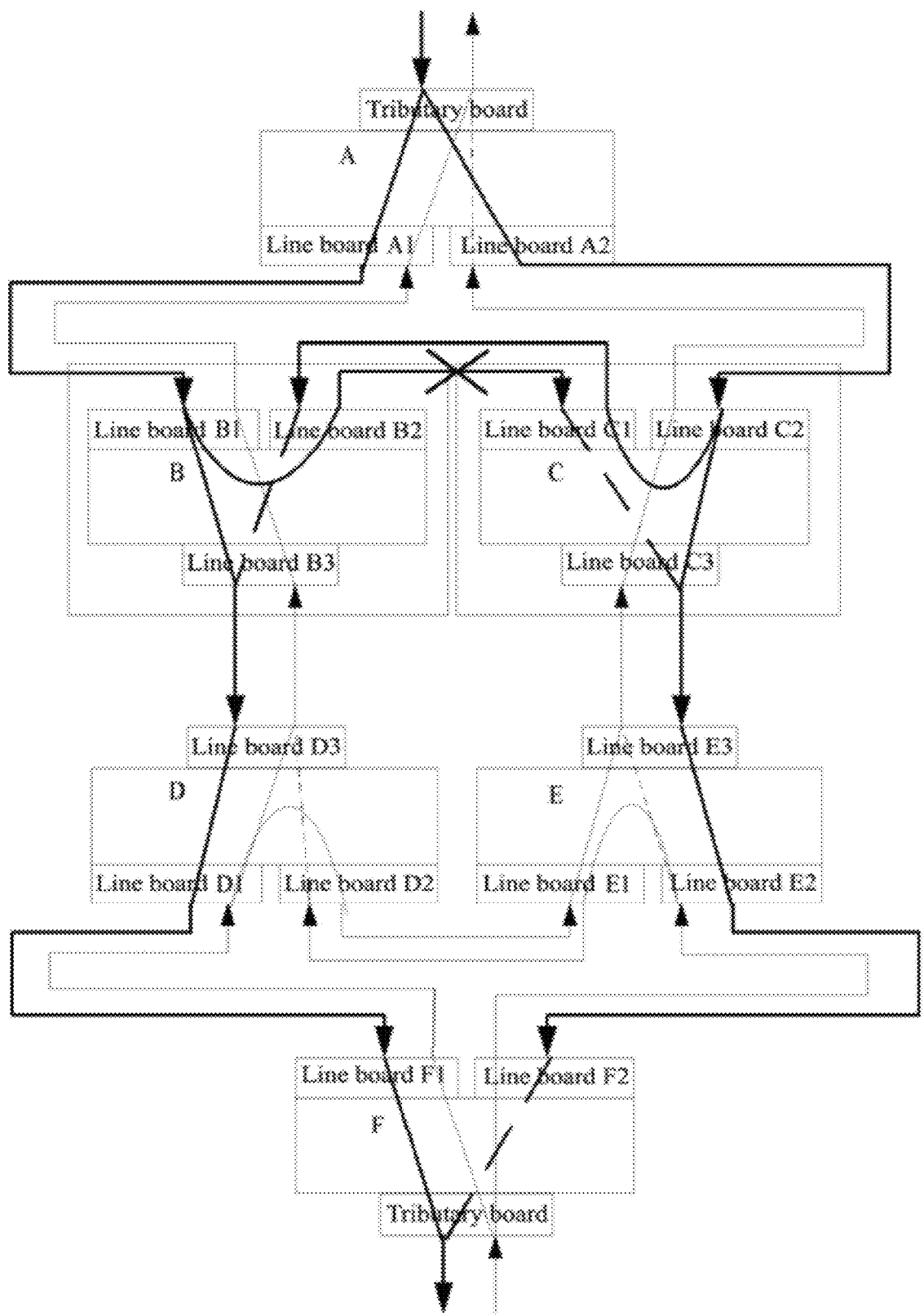
FIG. 11 is a schematic diagram of the switching action of the node C when the fault shown in FIG. 10 occurs.

The line board that the working service on Node C is connected to detects an alarm, according to the 1+1 protection protocol, the working service A->B->C is switched to the protection service A->C in the configured 1+1 protection group, as shown in FIG. 11. The node F cannot detect the alarm.

In the process of processing the PSE event, the slave node C sends the APS signal to the node F, it is the working service that is connected to the node F, and the APS signal sent by the slave node C is not processed.

Figure 12:
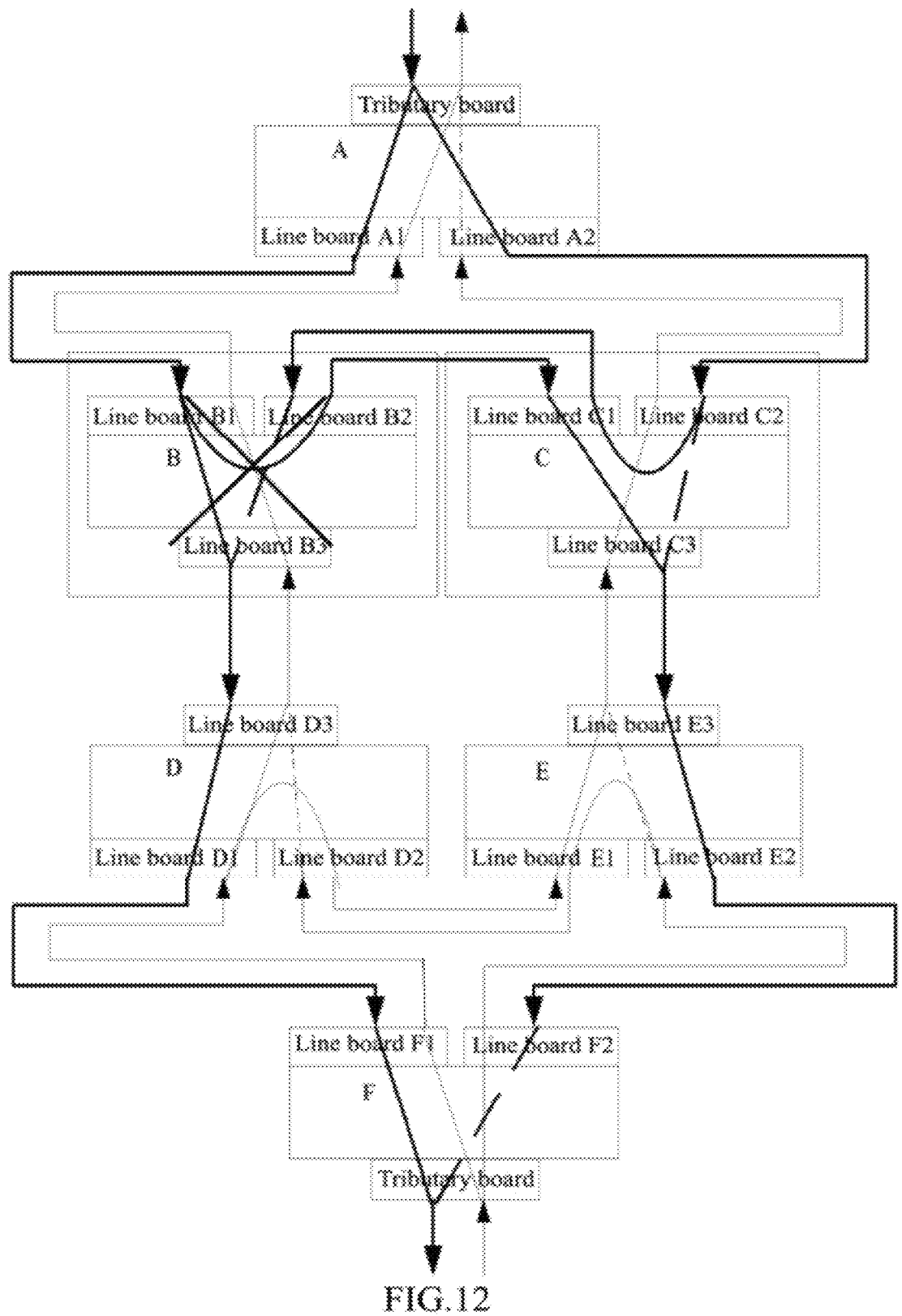
FIG. 12 is an illustration that a fault occurs in the node B in the DNI protection structure.

Fault 4: the interconnection node B that is on the same ring as the add node fails, as shown in FIG. 12.

Figure 13:
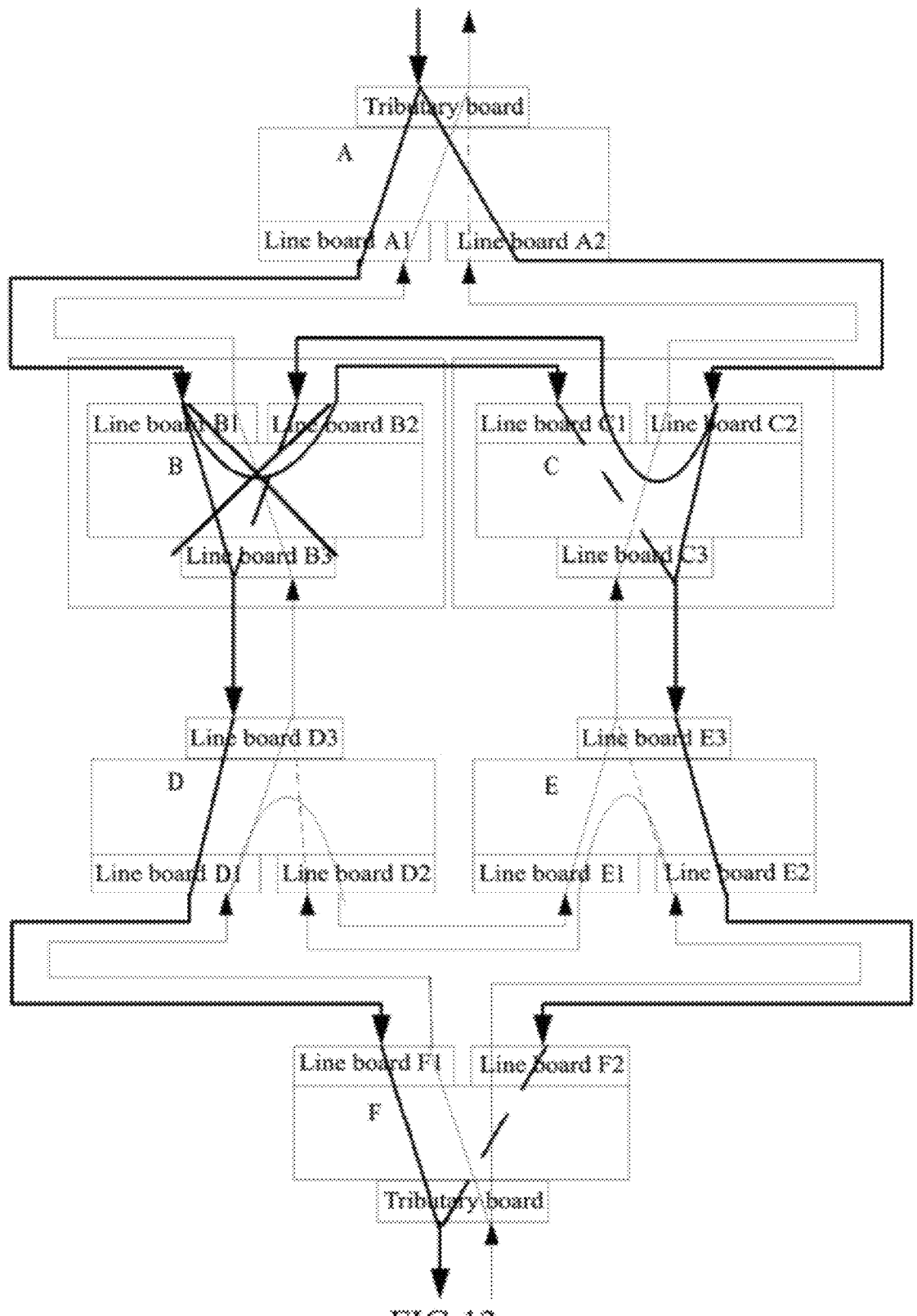
FIG. 13 is a schematic diagram of the switching action of the node C when the fault shown in FIG. 12 occurs.

The line board that the working service on the Node C is connected to detects an alarm, and according to the 1+1 protection protocol, the working service A->B->C is switched to the protection service A->C in the configured 1+1 protection group, as shown in FIG. 13.

Figure 14:
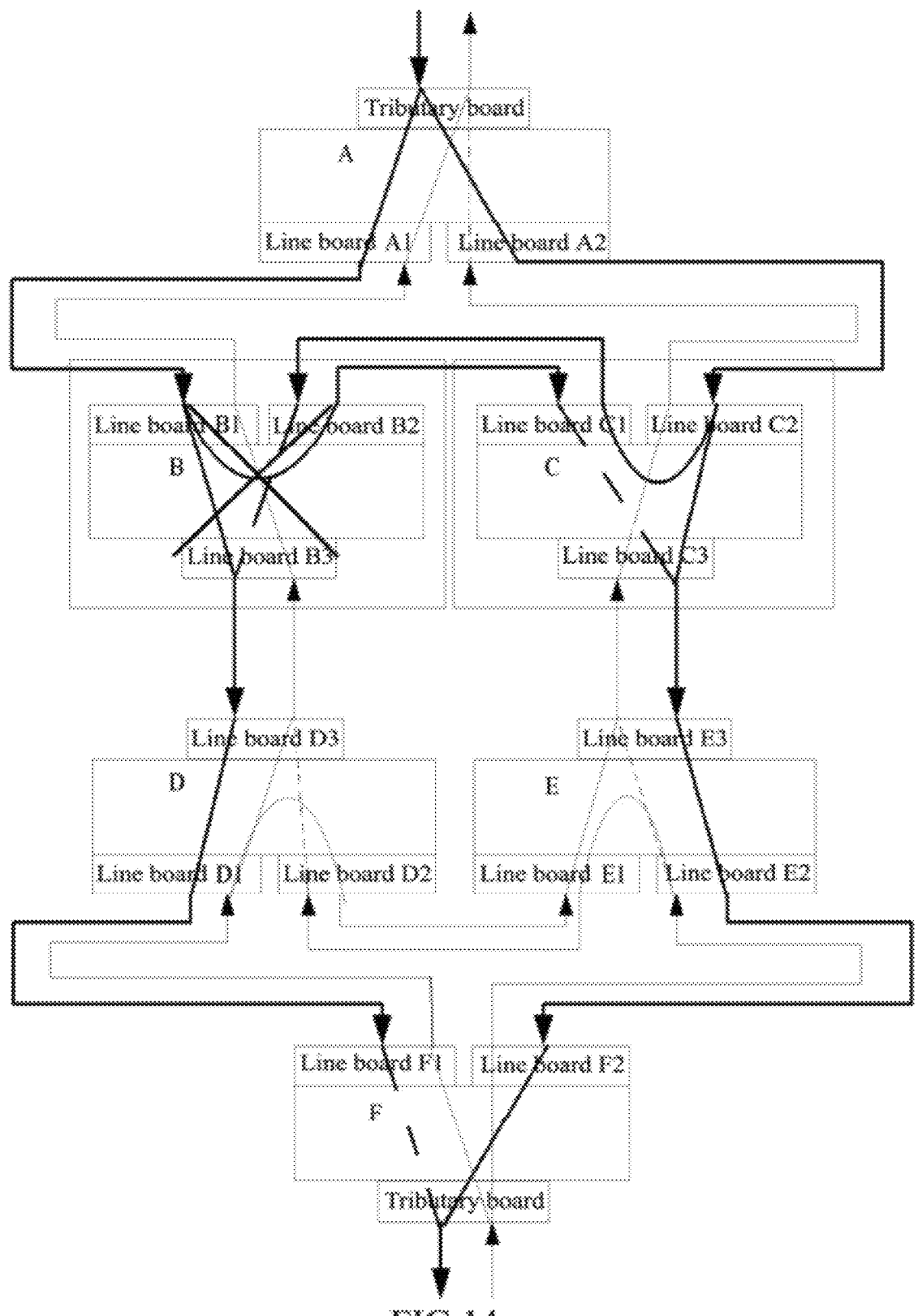
FIG. 14 is a schematic diagram of the switching action of the node F when the fault shown in FIG. 12 occurs.

The line board that the working service on the Node F is connected detects an alarm, and in the Holdoff alarm waiting time, the alarm does not disappear. According to the 1+1 protection protocol, the node F switches from the working service D->F to the protection service E->F in the configured 1+1 protection group, as shown in FIG. 14.

The process of processing the PSE event is: it is the protection service that is currently connected to the node F that performs the switching, if the APS signal sent by the node C is not received, send an APS signal to the slave node C to query. Before the node C receives the APS signal sent by the node F, if the APS signal is not sent to the node F, send the APS signal (if it is already sent, it might be sent again or not), and the signal carries the ID (ID=4) of the service connected to the local node; the node F processes the APS signal sent by the query node C, finds that the currently connected service changes, and reports the currently connected service ID to the management plane, and the ID is 4.

Industrial Applicability

By the method and system for service protection based on the DNI protection structure in the invention, by creating a DNI protection group in the management plane and adapting the services in the DNI protection group as the 1+1 protection group on the interconnection nodes and the drop node, the reliable protection of the services in the DNI protection group is achieved through the linkage of the 1+1 protection of these nodes.

What is claimed is:

1. A method for service protection, comprising:
    when creating a dual node interconnection (DNI) protection group based on a DNI protection structure, configuring a plurality of services in one direction, wherein, one of the services is a working service, and the others are protection services, the plurality of services have a same add node and a same drop node, but not exactly same passed interconnection nodes;
    on each interconnection node on an add ring, adapting two services in the DNI protection group transferred through the current interconnection node on the add ring to a drop ring as two services in a 1+1 protection group; on the drop node, adapting the services of the DNI protection group as two services in a 1+1 protection group coming from two directions of the drop ring; and
    during a fault, the interconnection nodes and the drop node performing switching in accordance with 1+1 protection protocol to protect the services in the DNI protection group;
    so as to achieve the service protection based on the DNI protection structure in a transport network;
    wherein, during the fault, the step of the interconnection nodes and the drop node performing switching in accordance with 1+1 protection protocol comprises:
    after each interconnection node on the add ring detects a fault alarm related to the DNI protection group, performing the switching in accordance with the 1+1 protection protocol;
    an alarm waiting time of a single board being set on the drop node, when the drop node detects a fault alarm related to the DNI protection group, it starting a timer to time, and before the timing reaches the alarm waiting time, if the fault is detected as disappeared, no switching being executed, otherwise, after the timing reaches the alarm waiting time, performing the switching in accordance with the 1+1 protection protocol.

2. The service protection method of claim 1, wherein,
    the transport network is an optical transport network,
    in the step of creating a DNI protection group based on the DNI protection structure, a management plane configuring four services in one direction for each DNI protection structure, wherein, one service is the working service, and the other three are the protection services.

3. The service protection method of claim 1, wherein,
    the step of the switching comprises: the drop node determining an interconnection node on the add ring that a service in the DNI protection group which is connected to the drop node passes, acquiring from a signal sent from the interconnection node a service in the DNI protection group that is connected to the interconnection node and sent to the drop ring, and then determining the service as the currently connected service.

4. The service protection method of claim 3, wherein, the method also comprises:
    after the drop node determines the currently connected service, if the currently connected service is different from the previously connected service, recording the currently connected service and reporting it to a management plane of the transport network.

5. The service protection method of claim 1, wherein,
    the step of on each interconnection node on the add ring, adapting the two services in the DNI protection group transferred through the current interconnection node on the add ring to the drop ring as the two services in the 1+1 protection group comprises: changing attributes of the two services from pass-through services to drop services, and changing the drop node of the two services to be the current interconnection node on the add ring;
    the step of on the drop node, adapting the services in the DNI protection group as the two services in the 1+1 protection group on the drop node comprises: taking two interconnected nodes on the drop ring as the add nodes of the two services in the 1+1 protection group respectively, and taking the drop node as the drop nodes of the two services in the 1+1 protection group.

6. The service protection method of claim 1, wherein, the method also comprises:
    configuring the interconnection node on the add ring that the working service in the DNI protection group passes as a master node, and configuring the other interconnection node on the add ring as a slave node;
    the step of on each interconnection node on the add ring, adapting the two services in the DNI protection group that are transferred through the current interconnection node on the add ring to the drop ring as the two services in the 1+1 protection group comprises:
    when on the master node, adapting the two services in the DNI protection group transferred through the master node to the drop ring as the two services in the 1+1 protection group, adapting the working service in the DNI protection group as the working service in the 1+1 protection group, and adapting the protection service in the DNI protection group as the protection services in the 1+1 protection group; and
    on the slave node, adapting the two protection services in the DNI protection group transferred through the slave node to the drop ring as the working service and the protection service in the 1+1 protection group respectively;

the step of on the drop node, adapting the services in the DNI protection group as the two services in the 1+1 protection group transferred from the two directions of the drop ring comprises:
on the drop ring, taking one service in the 1+1 protection group in the same direction from which the working service in the DNI protection group is transferred as the working service in the 1+1 protection group.

7. The service protection method of claim 6, wherein, the method also comprises:
after the node in the master node and the slave node that performs the switching performs the switching, sending a first automatic protection switching (APS) signal to the drop node as a service connected notification, wherein, the first APS signal carries identification information of the service in the DNI protection group that is currently connected to the node from which the first APS is sent and sent to the drop ring;
after the drop node receives the first APS signaling sent to the drop node, if it is the working service in the DNI protection group that is currently connected to the drop node, the drop node processing the first APS signal sent by the master node, if it is the protection service in the DNI protection group that is currently connected to the drop node, the drop node processing the first APS signal sent by the slave node; the drop node determining the service in the DNI protection group that is identified by the identification information in the processed first APS signal as the currently connected service.

8. The service protection method of claim 7, wherein, the first APS signal also carries the identification information of a destination node and node attribute information used to indicate whether the node from which the first APS is sent is a master node or a slave node, wherein, the destination node is the drop node;
the method also comprises: after the drop node receives the first APS signal, it determining that the signal is the APS signal sent to the drop node according to the identification information of the destination node in the first APS signal, and determining whether a sender of the first APS signal is the master node or the slave node according to the node attribute information in the first APS signal.

9. The service protection method of claim 8, wherein, bridged signal information is not filled in the first APS signal, the identification information of the destination node uses an information unit where the bridged signal information is located, and the node attribute information uses a reserved bit in the APS signal; alternatively, the bridged signal information is not filled in the first APS signal, the node attribute information uses the information unit where the bridged signal information is located, and the identification information of the destination node uses the reserved bit in the APS signal.

10. The service protection method of claim 7, wherein, the method also comprises:
after the drop node determines the currently connected service, if the currently connected service is different from the previously connected service, recording the currently connected service and reporting it to a management plane of the transport network.

11. The service protection method of claim 6, wherein, the method also comprises:
after the drop node executes the switching, if it is the working service in the DNI protection group that is currently connected to the drop node and the first APS signal sent by the master node is not received, sending a second APS signal to the master node to query the connected service; if it is the protection service in the DNI protection group that is currently connected to the drop node and the first APS signal sent by the slave node is not received, sending a second APS signal to the slave node; after the master node or the slave node receives the second APS signal, if the first APS signal has not been sent, sending the first APS signal to the drop node; alternatively,
after the drop node executes the switching, if it is the working service in the DNI protection group that is currently connected to the drop node, sending a second APS signal to the master node to query the connected service, if it is the protection service in the DNI protection group that is currently connected to the drop node, sending a second APS signal to the slave node; after the master node or the slave node receives the second APS signal, it sending the first APS signal to the drop node;
the method also comprises: after the drop node receives the first APS signal, which carries identification information of the service in the DNI protection group that is currently connected to the node from which the first APS is sent and sent to the drop ring, from the queried node, it determining the service in the DNI protection group that is identified by the identification information in the first APS signal as the currently connected service.

12. The service protection method of claim 11, wherein, the method also comprises:
after the drop node determines the currently connected service, if the currently connected service is different from the previously connected service, recording the currently connected service and reporting it to a management plane of the transport network.

13. The service protection method of claim 11, wherein, the first APS signal also carries the identification information of a destination node and node attribute information used to indicate whether the node from which the first APS is sent is a master node or a slave node, wherein, the destination node is the drop node;
the method also comprises: after the drop node receives the first APS signal, it determining that the signal is the APS signal sent to the drop node according to the identification information of the destination node in the first APS signal, and determining whether a sender of the first APS signal is the master node or the slave node according to the node attribute information in the first APS signal.

14. The service protection method of claim 13, wherein, bridged signal information is not filled in the first APS signal, the identification information of the destination node uses an information unit where the bridged signal information is located, and the node attribute information uses a reserved bit in the APS signal; alternatively, the bridged signal information is not filled in the first APS signal, the node attribute information uses the information unit where the bridged signal information is located, and the identification information of the destination node uses the reserved bit in the APS signal.

15. A service protection system, comprising a plurality of nodes of a dual node interconnection (DNI) protection structure and a corresponding management plane, wherein:
the management plane is set to: when creating a DNI protection group based on the DNI protection structure, configure a plurality of services in one direction, wherein, one of the services is the working service, and the others are the protection services, the plurality of services have a same add node and a same drop node, but not exactly same passed interconnection nodes;

each interconnection node on an add ring one which the add node is located is set to: adapt two services in the DNI protection group transferred through this node to a drop ring as two services in a 1+1 protection group; during a fault, perform switching according to 1+1 protection protocol;

the drop node is set to: adapt the services in the DNI protection group as the two services in the 1+1 protection group that are transferred through two directions of a drop ring; during a fault, perform the switching according to the 1+1 protection protocol;

so as to achieve the service protection based on the DNI protection structure in a transport network;

wherein, each interconnection node on the add ring is further set to: after each interconnection node on the add ring detects a fault alarm related to the DNI protection group, perform the switching in accordance with the 1+1 protection protocol;

the drop node is further set to: set an alarm waiting time of a single board on the drop node, when the drop node detects a fault alarm related to the DNI protection group, start a timer to time, and before the timing reaches the alarm waiting time, if the fault is detected as disappeared, not execute the switching, otherwise, after the timing reaches the alarm waiting time, perform the switching in accordance with the 1+1 protection protocol.

16. The service protection system of claim 15, wherein, the transport network is an optical transport network;

the management plane is set to: for each DNI protection structure, configure four services in one direction, wherein, one service is the working service, and the other three are the protection services;

the interconnection node on the add ring is set to: when adapting the two services in the DNI protection group transmitted through the local node to the drop node as the two services in the 1+1 protection group, change attributes of the two services from pass-through services to drop services, and change the drop nodes of the two services to be the local node;

the drop node is set to: when adapting the services in the DNI protection group as the two services in the 1+1 protection group, take two interconnected nodes on the drop ring as the add nodes of the two services in the 1+1 protection group respectively, and take the local node as the drop node of the two services in the 1+1 protection group.

17. The service protection system of claim 16, wherein, the management plane is also set to configure the interconnection node on the add ring that the working service in the DNI protection group passes as the master node, and configure the other interconnection node on the add ring as the slave node;

the master node is set to: when adapting the two services in the DNI protection group that are transferred through the local node to the drop ring as the two services in the 1+1 protection group, adapt the working service in the DNI protection group as the working service in the 1+1 protection group, and adapt the protection services in the DNI protection group as the protection services in the 1+1 protection group;

the slave node is set to adapt the two services in the DNI protection group transferred through the local node to the drop ring as the working service and the protection service in the 1+1 protection group respectively;

the drop node is set to: take one service in the 1+1 protection group in the same direction of transferred the working service in the DNI protection group as the working service in the 1+1 protection group.

18. The service protection system of claim 15, wherein, the management plane is also set to configure the interconnection node on the add ring that the working service in the DNI protection group passes as the master node, and configure the other interconnection node on the add ring as the slave node;

the master node is set to: when adapting the two services in the DNI protection group that are transferred through the local node to the drop ring as the two services in the 1+1 protection group, adapt the working service in the DNI protection group as the working service in the 1+1 protection group, and adapt the protection services in the DNI protection group as the protection services in the 1+1 protection group;

the slave node is set to adapt the two services in the DNI protection group transferred through the local node to the drop ring as the working service and the protection service in the 1+1 protection group respectively;

the drop node is set to: take one service in the 1+1 protection group in the same direction of transferred the working service in the DNI protection group as the working service in the 1+1 protection group.

19. The service protection system of claim 18, wherein, the master node and the slave node are also set to: after performing the switching, send a first automatic protection switching (APS) signal to the drop node, the first APS signal carries the identification information of the service in the DNI protection group that is currently connected to the local node and sent to the drop ring;

the drop node is also set to: after receiving the first APS signal sent to the local node, if it is the working service in the DNI protection group that is currently connected to the local node, process the first APS signal sent by the master node, otherwise, process the first APS signal sent by the slave node; and determine the service in the DNI protection group that is identified by the identification information in the processed first APS signal as the currently connected service.

20. The service protection system of claim 19, wherein, the first APS signal sent by the master node and the slave node also carries the identification information of a destination node and node attribute information used to indicate whether the local node is a master node or a slave node, wherein, the destination node is the drop node;

the drop node is also set to: after receiving the first APS signal, determine the signal as the APS signal sent to the local node according to the identification information of the destination node in the first APS signal, and determine whether a sender of the first APS signal is the master node or the slave node according to the node attribute information in the first APS signal; and when the determined currently connected service is different from the previously connected service, record the currently connected service and report it to the management plane.

21. The service protection system of claim 18, wherein, the drop node is also set to: after executing the switching, if it is the working service in the DNI protection group that is currently connected to the local node and the first APS signal sent by the master node is not received, send a second APS signal to the master node to query the connected service; if it is the protection service in the DNI protection group that is currently connected to the local node and the first APS signal sent by the slave node is not received, send a second APS signal to the slave node; and, after receiving the first APS signal returned by the query node, determine the service in the DNI protection group identified by the identification information in the first APS signal as the currently connected service;

the master node and the slave node are also set to: after receiving the second APS signal, if the first APS signal has not been sent, send the first APS signal to the drop node, and the first APS signal carries the identification information of the service in the DNI protection group that is connected to the local node and sent to the drop ring.

22. The service protection system of claim 21, wherein, the first APS signal sent by the master node and the slave node also carries the identification information of a destination node and node attribute information used to indicate whether the local node is a master node or a slave node, wherein, the destination node is the drop node;

the drop node is also set to: after receiving the first APS signal, determine the signal as the APS signal sent to the local node according to the identification information of the destination node in the first APS signal, and determine whether a sender of the first APS signal is the master node or the slave node according to the node attribute information in the first APS signal; and when the determined currently connected service is different from the previously connected service, record the currently connected service and report it to the management plane.

* * * * *